Oct. 18, 1966  H. B. GOULD ETAL  3,279,112
X-RAY FILM HOLDER
Filed Jan. 28, 1965
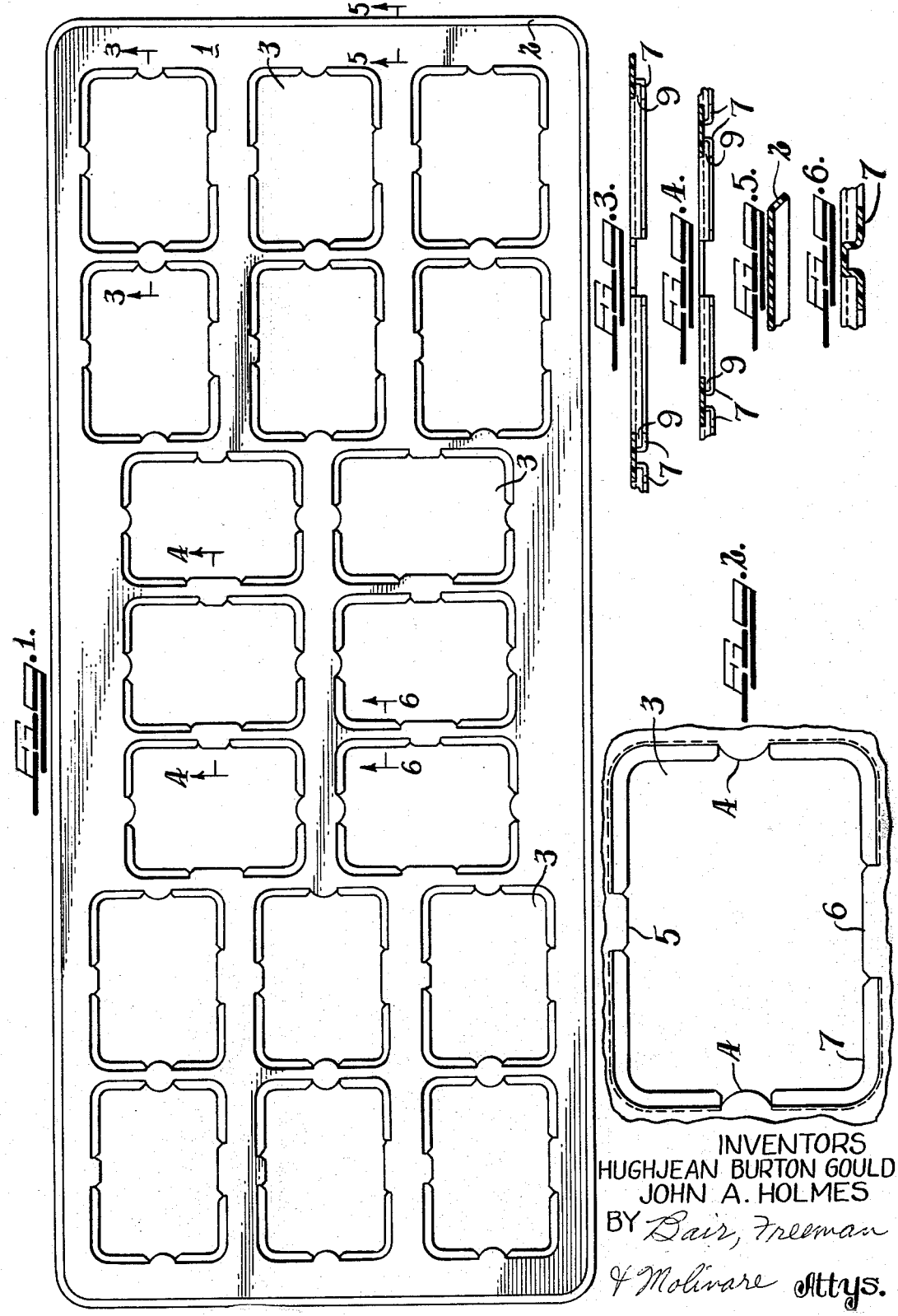
INVENTORS
HUGHJEAN BURTON GOULD
JOHN A. HOLMES
BY Bair, Freeman
& Molinare Attys.

3,279,112
X-RAY FILM HOLDER
Hughjean Burton Gould, Berwyn, and John A. Holmes, Oak Lawn, Ill., assignors to Revere Incorporated, a corporation of Illinois
Filed Jan. 28, 1965, Ser. No. 428,774
7 Claims. (Cl. 40—158)

This invention relates to X-ray film strip holders and particularly to an improved holder wherein X-ray film strips may be easily inserted and removed.

X-ray film strip holders are well-known in the art and are partcicularly useful in holding dental X-ray film strips for viewing. Prior art X-ray film strip holders are not entirely satisfactory in several respects. Many known types of holders which hold a large number of film strips are not sufficiently rigid to be entirely satisfactory, difficulties frequently are encountered in inserting the film strips into the viewing slots, and larger film strip holders are not sufficiently rigid to be used as holders for insertion of undeveloped strips into developing solution.

It is thus an object of this invention to provide an improved X-ray film strip holder into which film strips are easily inserted, without buckling or the other problems commonly present in prior art holders.

It is another object of this invention to provide an improved X-ray film strip holder which is rigid, even in larger sizes, and may be used as a mount for undeveloped film strips for insertion into containers of developing solution.

It is a further object of this invention to provide an improved film strip holder capable of achieving the above objects and also which has the capacity for holding a large number of film strips without any sacrifice in the ease of inserting individual strips or in the rigidity of the holder.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawing in which:

FIGURE 1 is a plan view of one illustrative embodiment of the invention;

FIGURE 2 is an enlarged view of one window of the embodiment of FIGURE 1;

FIGURE 3 is a view, partially in section, taken substantially as shown along line 3—3 of FIGURE 1;

FIGURE 4 is a view, partially in section, taken substantially as shown along line 4—4 of FIGURE 1;

FIGURE 5 is a view, partially in section, taken substantially as shown along line 5—5 of FIGURE 1; and FIGURE 6 is a view, partially in section, taken substantially as shown along line 6—6 of FIGURE 1.

As shown by the illustrative embodiment depicted in the drawing, the X-ray film strip holder of the invention comprises a supporting frame 1 preferably of resilient material, such as plastic or thin metal material, which frame is formed with a plurality of windows 3, as shown in FIGURE 1. It should be understood that the number of the windows 3 can vary, as desired, depending upon the size of supporting frame 1 and the dimensions of the windows. The windows may be arranged in any desired manner, but preferably are staggered in their orientation to lend rigidity to the frame.

To give further rigidity to frame 1 in accordance with one feature of this invention, its periphery advantageously is reinforced with a rim or a flange. One illustrative embodiment of this construction is shown in FIGURE 5 wherein the periphery of frame 1 is angled downwardly to provide lip-like edge 2. Those skilled in the art will recognize that other means may be used to accomplish this end. For example, the periphery may be beaded to provide a flange or the periphery may be crimped 180° to form a double thickness of the frame at the edge which acts as a rigidifying means.

Referring to FIGURE 2, each window, shown generally at 3, is of generally rectangular shape, having a tab extending from each side inwardly toward the center of the window. At each end of window 3 is a tab 4 of arcuate configuration. In accordance with a salient feature of this invention, tabs 5 and 6 at the sides of each window are of unequal width and are beveled at their corners. Tabs 5 and 6 are so arranged with respect to the longitudinal axis of each window that their ends are displaced so as to terminate out of line with one another. This can be seen in FIGURE 2 wherein tab 6 is wider than tab 5.

Around the periphery of each window, and subtending below the plane of frame 1, are shelf-life projections 7, as seen in FIGURES 3 and 4, which are in a plane parallel to frame 1. Each shelf 7 extends toward the center of the window for a distance substantially equal to the depth of tabs 4, 5 and 6. As seen in FIGURES 3 and 4, tabs 4, 5 and 6 and shelves 7 form a slot-like enclosure around each window into which X-ray film strips can be inserted. Shelves 7 are integral with frame 1 by means of vertical walls 8, as seen in FIGURE 6.

Film strips are inserted into the windows 3 by placing the end of a strip on shelves 7 across the window and guiding the strip along the shelves under tabs 5 and 6 to one tab 4, then buckling the free end under the other tab 4. Because tabs 5 and 6 are of different widths, a film strip sliding along shelf 7 will first contact the leading beveled edge of tab 6 and will slide under tab 6 for engagement in the slot formed by tab 6 and shelf 7 before contacting the leading edge of tab 5. In this way, buckling of the film strip as it is moved along shelf 7 is prevented since its leading edge of the strip does not strike the edges of tabs 5 and 6 simultaneously. In addition, the beveling of the edges of tabs 5 and 6 results in the film strip making a point contact rather than a line contact with the tabs as it is moved into place to further facilitate the ease of insertion. Those skilled in the art will appreciate that this novel construction prevents jamming of the film strip during the inserting operation.

Since tabs 4 are generally arcuate in shape, they present a point contact surface to the leading edge of a film strip being inserted as it approaches the end of the window. This facilitates the guiding of the film strip under the tab and prevents the buckling which frequently occurs when tabs 4 have a flat end surface and do not provide a point contact to the leading edge of a moving film strip.

It further will be appreciated that since frame 1 has no obstructions such as supporting sheets of transparent material on its back side, the film strips may be disengaged from the holder simply by pushing them through the windows out the back of frame 1. The use of open windows also permits the holder to be utilized for inserting undeveloped film strips into the containers of developing solution.

As described in the illustrative embodiment shown in FIGURES 1 and 2, tab 6 is wider than tab 5. It should be clear to those skilled in the art that tabs 5 and 6 may be of the same or unequal width since the only requirement of the invention is that they are displaced so that their respective opposite corners do not lie on the same transverse axis.

What is hereinabove shown and described is a preferred embodiment of the invention, it being understood that various changes may be made in the present invention without departing from the principles of the invention within the scope of the appended claims.

We claim:

1. A device for holding a plurality of film strips comprising a frame having a plurality of generally rectangular shaped windows, the side of each window having a tab co-planar and integral with said frame nd extending inwardly into said window, two of said tabs opposite one another in each window being of arcuate shape, the other two tabs of each window being of unequal width and having corners which lie on different transverse axes with respect to each window, means subtending beneath said frame and along the periphery of each window defining a shelf for supporting said film strips, said tabs and said shelf providing a slot-like enclosure for holding said film strips at their periphery.

2. A device of claim 1 wherein the other two tabs of each window have beveled corners.

3. Device of claim 1 wherein the periphery of said frame is a rim inclined to the plane of said frame.

4. A device for holding a plurality of film strips comprising a frame having a plurality of generally rectangular shaped windows, the side of each window having a tab integral with said frame and extending inwardly into said window, two of said tabs opposite one another in each window being of arcuate shape, the other two tabs of each window having corners which lie on different transverse axes with respect to each window, means subtending beneath said frame and along the periphery of each window defining a shelf for supporting said film strips, said tabs and said shelf providing a slot-like enclosure for holding said film strips at their periphery.

5. Device of claim 4 including means on the periphery of said frame for rigidifying said frame against movement transverse to the plane of said frame.

6. Device of claim 5 wherein the other two tabs of each window are of unequal width.

7. Device of claim 5 wherein said rigidifying means is a rim inclined to the plane of said frame.

References Cited by the Examiner

UNITED STATES PATENTS

| 1,474,174 | 11/1923 | Segall | 40—158 |
| 1,853,197 | 4/1932 | Bosworth | 40—158 |
| 2,968,882 | 1/1961 | Ozeki | 40—106.1 |

FOREIGN PATENTS

| 1,128,681 | 4/1962 | Germany. |

EUGENE R. CAPOZIO, *Primary Examiner.*

W. J. CONTRERAS, *Examiner.*